(12) United States Patent
Matsen et al.

(10) Patent No.: US 10,189,071 B2
(45) Date of Patent: Jan. 29, 2019

(54) METHOD FOR SUPERPLASTIC FORMING A MULTILAYER STRUCTURE HAVING A MONOLITHIC ATTACHMENT MEMBER

(71) Applicant: The Boeing Company, Chicago, IL (US)

(72) Inventors: Marc R. Matsen, Seattle, WA (US); David S. Nansen, Lopez Island, WA (US); Lee C. Firth, Renton, WA (US); Gregory A. Foltz, Seattle, WA (US)

(73) Assignee: The Boeing Company, Chicago, IL (US)

( * ) Notice: Subject to any disclaimer, the term of this patent is extended or adjusted under 35 U.S.C. 154(b) by 129 days.

(21) Appl. No.: 15/256,958

(22) Filed: Sep. 6, 2016

(65) Prior Publication Data
US 2018/0065165 A1    Mar. 8, 2018

(51) Int. Cl.
| | |
|---|---|
| *B21D 26/053* | (2011.01) |
| *B21D 31/04* | (2006.01) |
| *B23K 26/38* | (2014.01) |
| *B23K 26/40* | (2014.01) |
| *B21D 26/021* | (2011.01) |
| *B23K 20/12* | (2006.01) |
| *B23K 26/22* | (2006.01) |
| *B23K 26/32* | (2014.01) |
| *B23K 103/14* | (2006.01) |
| *B23K 101/00* | (2006.01) |
| *B23K 103/10* | (2006.01) |
| *B23K 103/16* | (2006.01) |
| *B23K 103/18* | (2006.01) |

(52) U.S. Cl.
CPC ......... *B21D 26/053* (2013.01); *B21D 26/021* (2013.01); *B21D 31/04* (2013.01); *B23K 20/127* (2013.01); *B23K 26/22* (2013.01); *B23K 26/32* (2013.01); *B23K 26/38* (2013.01); *B23K 26/40* (2013.01); *B23K 2101/006* (2018.08); *B23K 2103/10* (2018.08); *B23K 2103/14* (2018.08); *B23K 2103/166* (2018.08); *B23K 2103/26* (2018.08)

(58) Field of Classification Search
CPC .... B21D 26/053; B21D 26/021; B21D 31/04; B23K 20/127; B23K 2203/14; B23K 26/38; B23K 26/40; B23K 26/22; B23K 26/32; B23K 2103/26; B23K 2101/006; B23K 2103/10; B23K 2103/166; B23K 2103/14
See application file for complete search history.

(56) References Cited

U.S. PATENT DOCUMENTS

| | | |
|---|---|---|
| 5,645,744 A | 7/1997 | Matsen et al. |
| 5,683,608 A | 11/1997 | Matsen et al. |
| 5,728,309 A | 3/1998 | Matsen et al. |
| 6,180,932 B1 | 1/2001 | Matsen et al. |
| 6,914,225 B2 | 7/2005 | Fischer et al. |
| 2010/0310823 A1* | 12/2010 | Albertelli ............. B29C 70/086 428/139 |
| 2017/0050229 A1* | 2/2017 | Matsen ................ B21D 26/029 |

* cited by examiner

*Primary Examiner* — John C Hong
(74) *Attorney, Agent, or Firm* — Walters & Wasylyna LLC (57) ABSTRACT

A method for forming a multilayer structure from a precursor panel having an edge, the method including steps of connecting an attachment member to the precursor panel such that an edge of the attachment member is in alignment with the edge of the precursor panel and applying heat and gas pressure to expand the precursor panel.

20 Claims, 10 Drawing Sheets

METHOD FOR SUPERPLASTIC FORMING A MULTILAYER STRUCTURE HAVING A MONOLITHIC ATTACHMENT MEMBER

FIELD

This application relates to superplastic forming of multilayer structures and, more particularly, to the incorporation of monolithic attachment members into such multilayer structures.

BACKGROUND

Multilayer structures are typically formed from a core layer sandwiched between two face sheets. The core layer of a multilayer structure defines substantial air/void space and has an effective cross-sectional thickness that is substantially greater than the cross-sectional thicknesses of the adjacent face sheets. Therefore, multilayer structures typically possess relatively high strength and stiffness at relatively low weight. As such, multilayer structures are used in various aerospace applications.

Superplastic forming is a known technique for manufacturing multilayer structures, such as expanded two-sheet panels (no core layer) and expanded three-sheet panels (a core layer positioned between two face sheets), which may be used as alternatives to traditional honeycomb multilayer structures. Superplastic forming is a metal forming process that takes advantage of the superplasticity of certain materials, such as titanium alloys, aluminum alloys and nickel alloys, at elevated temperatures. When such materials are heated to a superplastic state, they become pliable and can be expanded (e.g., by gas pressure) against a mold to achieve a desired shape. During expansion, the material can experience elongation of several hundred percent.

While the air/void space in multilayer structures advantageously reduces density (increases bulk), it presents a complication when a multilayer structure must be connected to another structure (e.g., a frame or another multilayer structure). For example, inserting a mechanical fastener, such as a bolt, through a multilayer structure and then tightening down on the multilayer structure may cause collapse of the air/void space, which may compromise the associated connection.

Accordingly, those skilled in the art continue with research and development efforts in the field of multilayer structures.

SUMMARY

In one embodiment, disclosed is a method for forming a multilayer structure from a precursor panel having an edge. The method includes the steps of (1) connecting an attachment member to the precursor panel such that an edge of the attachment member is aligned with the edge of said precursor panel and (2) applying heat and gas pressure to expand the precursor panel.

In another embodiment, the disclosed method for forming a multilayer structure includes the steps of: (1) providing a precursor panel having a layered structure; (2) forming a recess in the precursor panel, the recess defining an edge; (3) positioning an attachment member in the recess such that an edge of the attachment member is in alignment with the edge of the precursor panel, the attachment member having a monolithic body; (4) welding the attachment member to the precursor panel; and (5) applying heat and gas pressure to expand the precursor panel.

In yet another embodiment, the disclosed method for forming a multilayer structure includes the steps of: (1) providing a precursor panel having a layered structure, the precursor panel defining a perimeter and an edge extending about the perimeter; (2) positioning an attachment member against the precursor panel such that an edge of the attachment member is in alignment with the edge of the precursor panel, the attachment member having a monolithic body; (3) welding the attachment member to the precursor panel; and (4) applying heat and gas pressure to expand the precursor panel.

Other embodiments of the disclosed method for forming a multilayer structure will become apparent from the following detailed description, the accompanying drawings and the appended claims.

DETAILED DESCRIPTION

Figure 1:
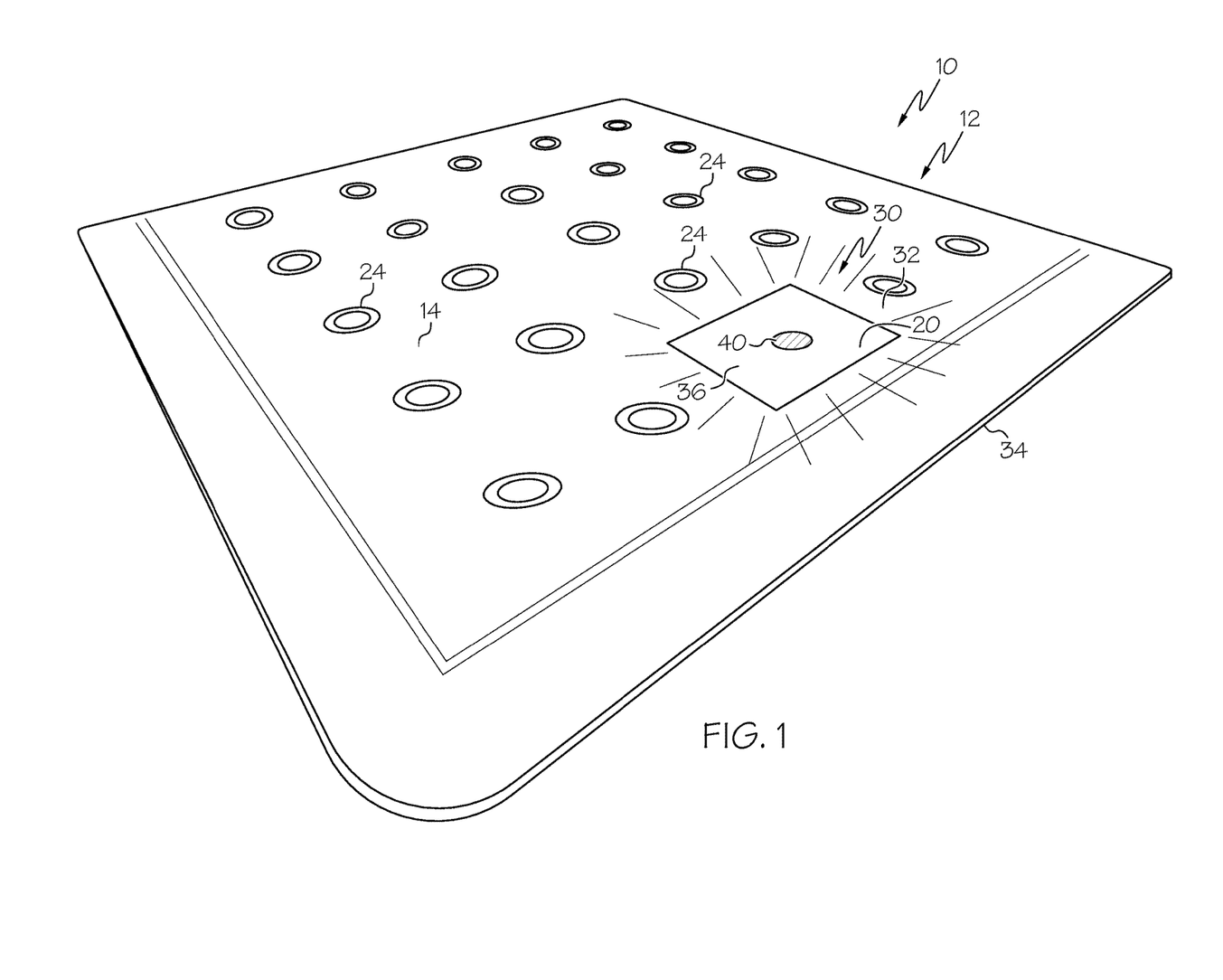
FIG. 1 is a perspective view of one embodiment of the disclosed multilayer structure.
Figure 2:
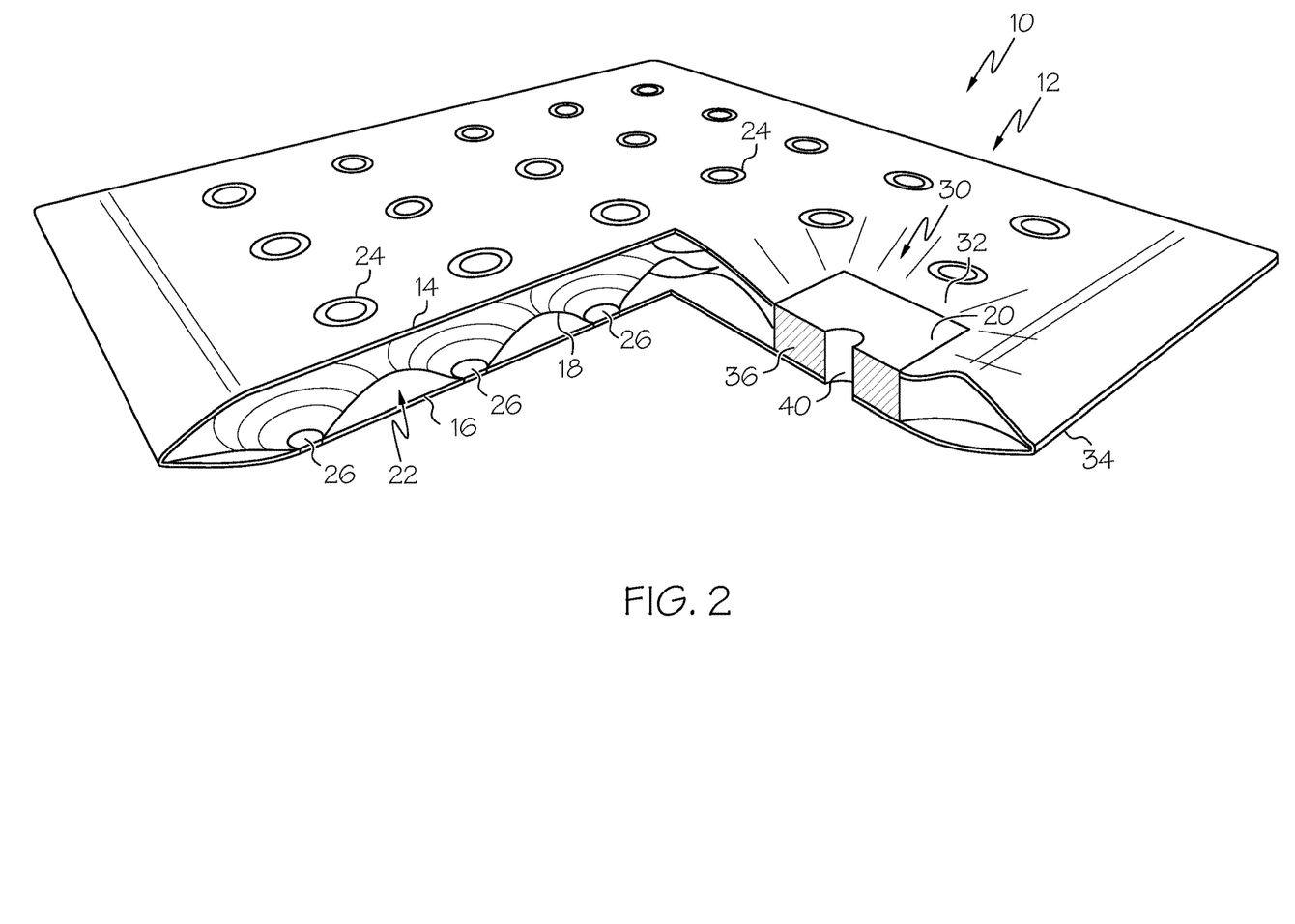
FIG. 2 is a perspective view of the multilayer structure of FIG. 1 with a cut-away portion revealing internal features.

Referring to FIGS. 1 and 2, one embodiment of the disclosed multilayer structure, generally designated 10, is an expanded three-sheet panel 12 that includes a first face layer 14, a second face layer 16 (FIG. 2), a core layer 18 (FIG. 2) and an attachment member 20. The first face layer 14 is spaced apart from the second face layer 16 to define an internal volume 22 (FIG. 2) of the multilayer structure 10. The core layer 18 is positioned in the internal volume 22, and is connected to the first face layer 14 by way of a plurality of first welds 24 and to the second face layer 16 by way of a plurality of second welds 26.

While the disclosed multilayer structure 10 is shown and described as a three-sheet panel 12 comprised of three layers (the first face layer 14, the second face layer 16 and the core layer 18), in one alternative embodiment the disclosed multilayer structure includes only two layers (e.g., only two face layers), while in another alternative embodiment the disclosed multilayer structure includes four or more layers (e.g., plural face layers and plural core layers). Furthermore, while the disclosed multilayer structure 10 is shown in FIGS. 1 and 2 as a three-sheet panel 12 having a substantially planar geometry, various non-planar geometries (e.g., curved, annular, complex shape and the like) may be formed without departing from the scope of the present disclosure.

The first face layer 14, the second face layer 16 and the core layer 18 of the disclosed multilayer structure 10 can be formed from various materials that exhibit superplastic behavior at elevated temperatures. In one particular implementation, the first face layer 14, the second face layer 16 and the core layer 18 are formed from a metallic material. General examples of suitable metallic materials include, without limitation, titanium alloys, aluminum alloys and nickel alloys. As one specific, non-limiting example, the first face layer 14, the second face layer 16 and the core layer 18 are formed from the titanium alloy Ti-6Al-4V.

The attachment member 20 is incorporated into the multilayer structure 10 at an attachment location 30, and may form a depression 32 in the multilayer structure 10 at the attachment location 30. In the illustrated embodiment (FIGS. 1 and 2), the multilayer structure 10 includes only a single attachment location 30, and the attachment location 30 is entirely within the perimeter 34 defined by the multilayer structure 10. However, those skilled in the art will appreciate that the multilayer structure 10 may include two or more attachment members 20, each at an associated attachment location 30, and that the attachment locations 30 may be at various locations within the perimeter 34 of the multilayer structure 10, as well as at various locations on the perimeter 34 of the multilayer structure 10 (e.g., the attachment member 20 may form at least a portion of the perimeter 34 of the multilayer structure 10).

The attachment member 20 of the multilayer structure 10 includes a monolithic body 36, as best shown in FIG. 2. The monolithic body 36 of the attachment member 20 is formed from the same or similar material used to form the first face layer 14, the second face layer 16 and the core layer 18, though using a dissimilar material will not result in a departure from the scope of the present disclosure. For example, the monolithic body 36 of the attachment member 20, as well as the first face layer 14, the second face layer 16 and the core layer 18, are formed from a titanium alloy, such as Ti-6Al-4V.

Without being limited to any particular theory, it is believed that using an attachment member 20 having a monolithic body 36-a body formed as a single integral piece without any seams or joints—provides a more solid and reliable foundation for making an attachment to the multilayer structure 10, whether by way of a mechanical fastener, welding or otherwise.

Figure 11:
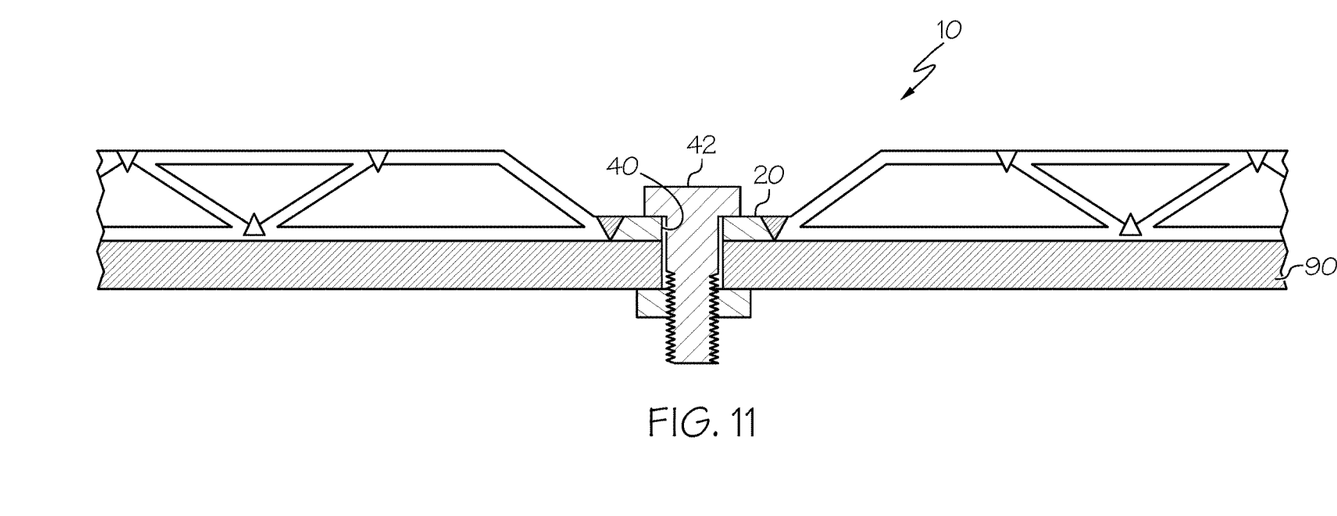
FIG. 11 is side cross-sectional view of the multilayer structure of FIG. 10 connected to an underlying structure by way of a mechanical fastener.

The attachment member 20 includes various features to facilitate connecting the multilayer structure 10 to one or more other structures, such as by way of mechanical fasteners, welding or the like. For example, a bore 40 sized and shaped to receive a mechanical fastener 42 (FIG. 11), such as a bolt, is formed in the attachment member 20. Various other features, such as a countersink, a counterbore, an integral collar, cutouts/carve-outs (e.g., to reduce weight) and the like, may be formed in the monolithic body 36 of the attachment member 20 without departing from the scope of the present disclosure.

Thus, while the portion of the multilayer structure 10 surrounding the attachment member 20 has a layered cross-sectional profile, the monolithic body 36 of the attachment member 20 has a continuous and integral cross-sectional profile. As such, the attachment member 20 may provide a solid and rigid foundation for connecting the multilayer structure 10 to one or more other structures.

Figure 3:
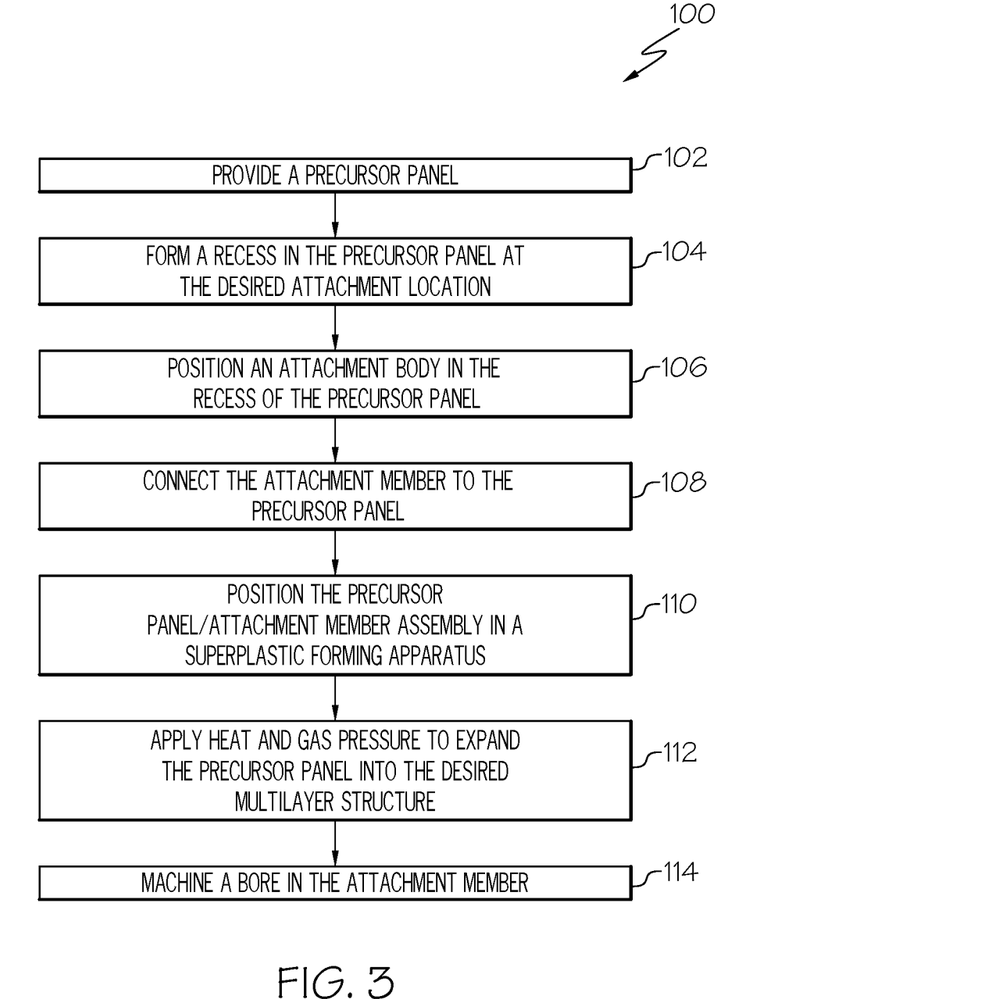
FIG. 3 is a flow diagram depicting one embodiment of the disclosed method for forming a multilayer structure.

Referring now to FIG. 3, disclosed is a method for forming a multilayer structure having a monolithic attachment member. One embodiment of the disclosed method, generally designated 100, begins at Block 102 with the step of providing a precursor panel 50 (FIG. 4) that will be formed into the desired multilayer structure.

Figure 4:
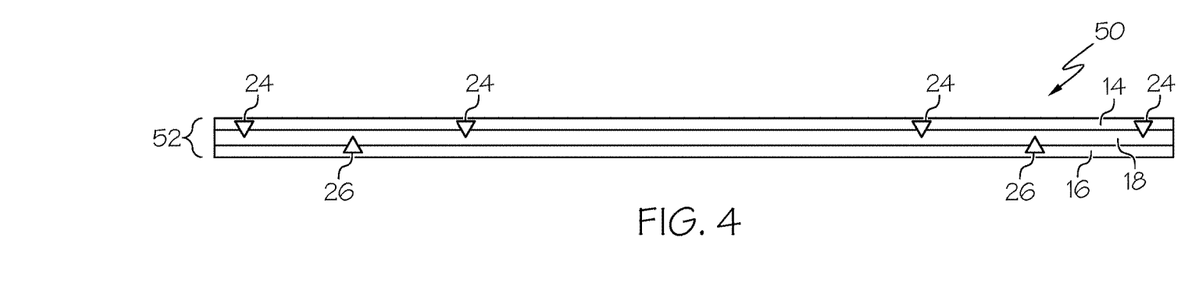
FIG. 4 is a side cross-sectional view of a precursor panel shown during one step of the method of FIG. 3.

As shown in FIG. 4, the precursor panel 50 has a layered structure 52 that includes, for example (in the case of a three-sheet panel 12 (FIGS. 1 and 2)), a core layer 18 sandwiched between a first face layer 14 and a second face layer 16. The first face layer 14 is welded to the core layer 18 by a plurality of first welds 24 (e.g., weld joints). The core layer 18 is welded to the second face layer 16 by a plurality of second welds 26 (e.g., weld joints). The first welds 24 and the second welds 26 may be partial penetration welds. The core layer 18 is welded to the first and second face layers 14, 16 such that half the welds (e.g., first welds 24) are between the first face layer 14 and the core layer 18 and the other half of the welds (e.g., second welds 26) are between the opposed second face layer 16 and the core layer 18. The first welds 24 may be aligned with each other and may form a grid of first welds 24. The second welds 26 may be aligned with each other and may from a grid of second welds 26. First welds 24 and second welds 26 may be offset from each other.

Figure 5:
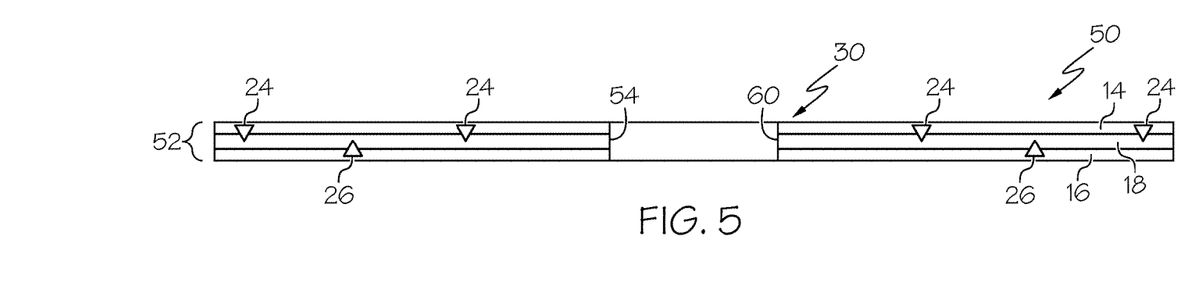
FIG. 5 is a side cross-sectional view of the precursor panel of FIG. 4, but shown during a subsequent step of the method of FIG. 3.

At Block 104 (FIG. 3), a recess 54 is formed in the precursor panel 50 at the desired attachment location 30, as shown in FIG. 5. The recess 54 defines an edge 60 of the precursor panel 50 (e.g., an internal edge). The recess 54 extends entirely through the cross-sectional thickness of the layered structure 52 of the precursor panel 50. Alternatively, the recess 54 extends only partially through the layered structure 52, such as through the first face layer 14 and the core layer 18, but not through (or only partially through) the second face layer 16.

Various techniques may be used to form the recess 54 (and associated edge 60) in the precursor panel 50. As one option, the recess 54 is formed after the precursor panel 50 has been assembled and welded together. For example, the recess 54 is formed by cutting (e.g., die-cutting, laser cutting, plasma cutting, etc.) the assembled precursor panel 50. As another option, the recess 54 is formed by cutting the layers (the first face layer 14, the second face layer 16 and the core layer 18) of the precursor panel 50 prior to assembling the layers 14, 16, 18 into the layered structure 52, thereby forming the recess 54 upon assembly of the layers 14, 16, 18 into the layered structure 52 (e.g., Blocks 102 and 104 are performed simultaneously).

Figure 6:
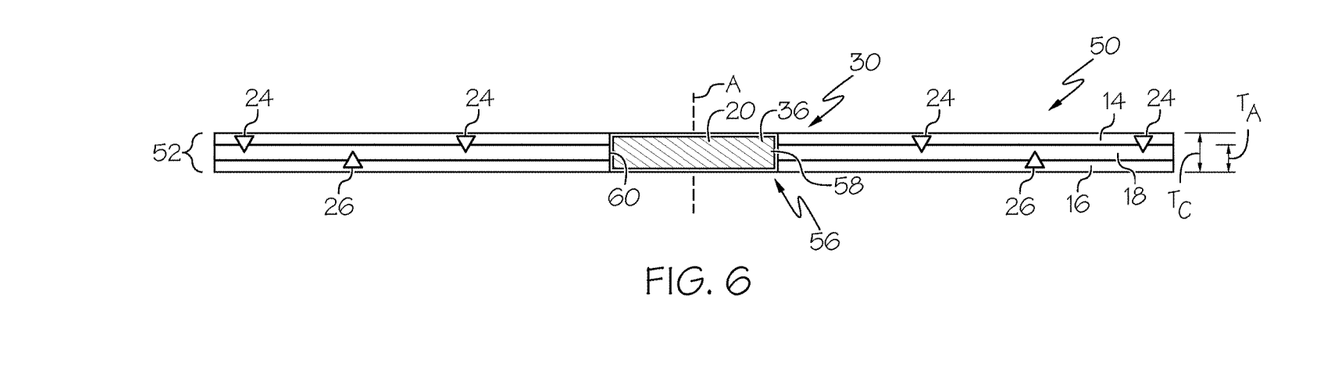
FIG. 6 is a side cross-sectional view of the precursor panel of FIG. 5, but shown during a subsequent step of the method of FIG. 3.

At Block 106 (FIG. 3), an attachment member 20 is positioned in the recess 54 formed in the precursor panel 50, as shown in FIG. 6. The attachment member 20 has a monolithic body 36 that is sized and shaped to be closely received in the recess 54. Therefore, the attachment member 20 is in edge-to-edge alignment with the precursor panel 50, and any gap 56 between the edge 58 of the attachment member 20 and the edge 60 of the precursor panel 50 are minimized.

The attachment member 20 is shown in FIGS. 1, 2 and 6 having a square shape in plan view (along the recess axis A shown in FIG. 6), and being received in a recess 54 that is also square in plan view (along the recess axis A shown in FIG. 6). However, the shape of the recess 54 and the corresponding shape of the attachment member 20 may vary (e.g., may be circular, polygonal, irregular, etc.) without departing from the scope of the present disclosure.

As shown in FIG. 6, the attachment member 20 has a cross-sectional thickness $T_A$ that is less than the combined cross-sectional thickness $T_C$ of the layers 14, 16, 18 of the layered structure 52 of the precursor panel 50. For example, the cross-sectional thickness $T_A$ of the attachment member 20 ranges from about 20 to about 80 percent of the combined cross-sectional thickness $T_C$ of the precursor panel 50. In one variation, the cross-sectional thickness $T_A$ of the attachment member 20 is substantially equal to the combined cross-sectional thickness $T_C$ of the precursor panel 50. In another variation, the cross-sectional thickness $T_A$ of the attachment member 20 is greater than the combined cross-sectional thickness $T_C$ of the precursor panel 50.

Figure 7:
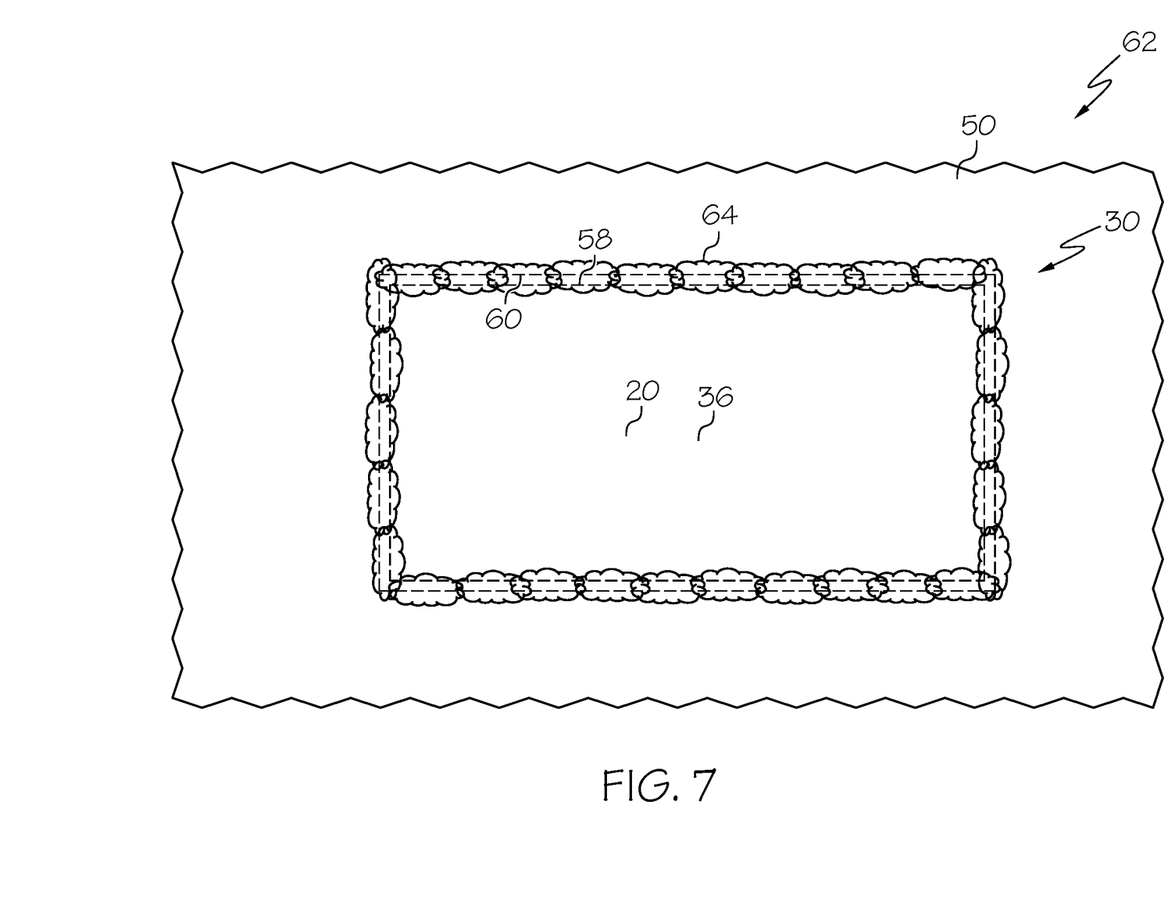
FIG. 7 is a top plan view of the precursor panel of FIG. 6.

At Block 108 (FIG. 3), the attachment member 20 is connected to the precursor panel 50 to form a precursor panel/monolithic body assembly 62, as shown in FIG. 7. For example, the edge 58 of the attachment member 20 is connected to the edge 60 of the precursor panel 50 such that the attachment member 20 is connected to each layer (the first face layer 14, the second face layer 16 and the core layer 18) of the layered structure 52 (FIG. 6) of the precursor panel 50.

The connection between the attachment member 20 and the precursor panel 50 can be made by welding, such as by arc welding, friction stir welding or the like. Therefore, the connecting step (Block 108) may result in the formation of a weld joint 64 between the attachment member 20 and the precursor panel 50. The weld joint 64 may extend only partially around the attachment member 20 or entirely around the attachment member 20.

Accordingly, after the connecting step (Block 108), the precursor panel/monolithic body assembly 62 includes both a monolithic portion (monolithic body 36) at the attachment location 30 and a layered portion (layered structure 52 (FIG. 6)) adjacent to the attachment location 30.

Figure 8:
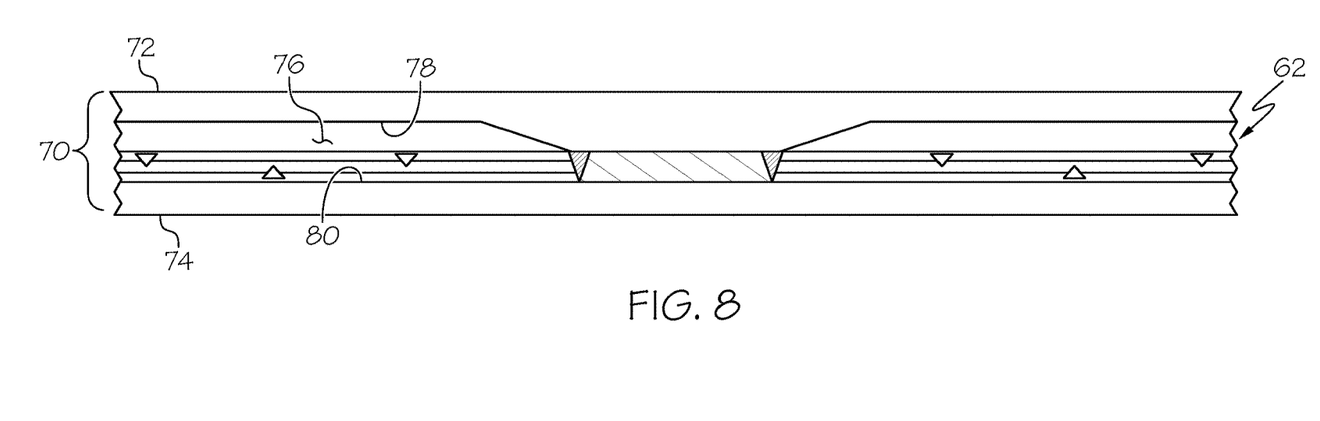
FIG. 8 is a side cross-sectional view of the precursor panel of FIG. 6 positioned in a superplastic forming apparatus in accordance with another step of the method of FIG. 3.

At Block 110 (FIG. 3), the precursor panel/monolithic body assembly 62 is positioned in a superplastic forming apparatus 70, as shown in FIG. 8. The superplastic forming apparatus 70 includes a first (e.g., upper) tool 72 and a second (e.g., lower) tool 74. The first tool 72 and the second tool 74 combine to define a forming cavity 76. At least a portion of the forming cavity 76 is shaped to correspond to the desired final shape of the multilayer structure 10 (FIGS. 1 and 2). Specifically, the first tool 72 includes a first forming surface 78 having a shape corresponding to the desired shape of the first face layer 14 of the multilayer structure 10 and the second tool 74 includes a second forming surface 80 having a shape corresponding to the desired shape of the second face layer 16 of multilayer structure 10.

Figure 9:
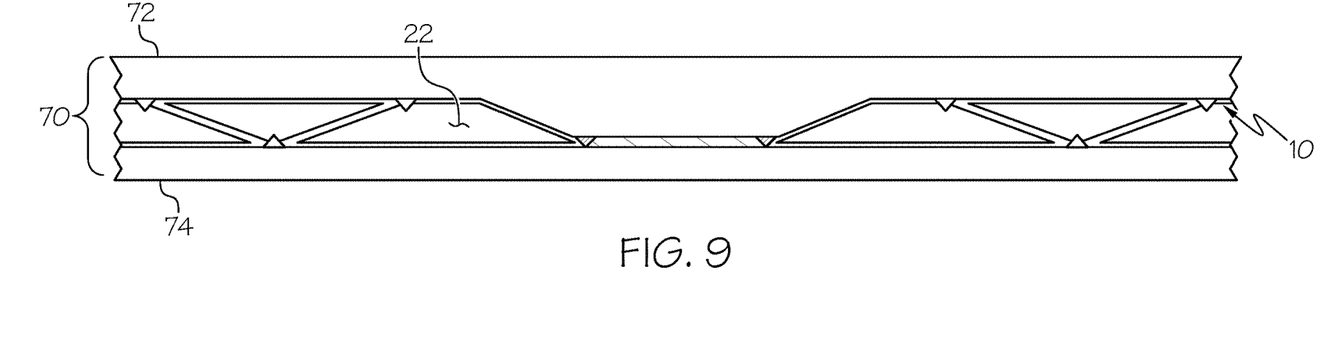
FIG. 9 is a side cross-sectional view of the precursor panel and superplastic forming apparatus of FIG. 8, but shown with the precursor panel expanded into a multilayer structure in accordance with another step of the method of FIG. 3.

At Block 112, with the precursor panel/monolithic body assembly 62 positioned in the superplastic forming apparatus 70, heat and gas pressure are applied to expand the precursor panel/monolithic body assembly 62 against the first and second tools 72, 74 of the superplastic forming apparatus 70, thereby yielding a multilayer structure 10 having the desired shape, as shown in FIG. 9. The heat applied during the step of applying heat and gas pressure (Block 112) may be sufficient to render superplastic the precursor panel/monolithic body assembly 62. Gas (e.g., heated air) introduced during the step of applying heat and gas pressure (Block 112) is directed into the internal volume 22 (the space between the first face layer 14 and the second face layer 16) of the precursor panel/monolithic body assembly 62 at a sufficient pressure to urge the superplastic material against the forming surfaces 78, 80 of the first and second tools 72, 74 of the superplastic forming apparatus 70.

At this point, those skilled in the art will appreciate that the steps of Blocks 110 and 112 relate to superplastic forming. Various superplastic forming techniques may be used to convert the disclosed precursor panel/monolithic body assembly 62 into the disclosed expanded multilayer structure 10 without departing from the scope of the present disclosure.

Figure 10:
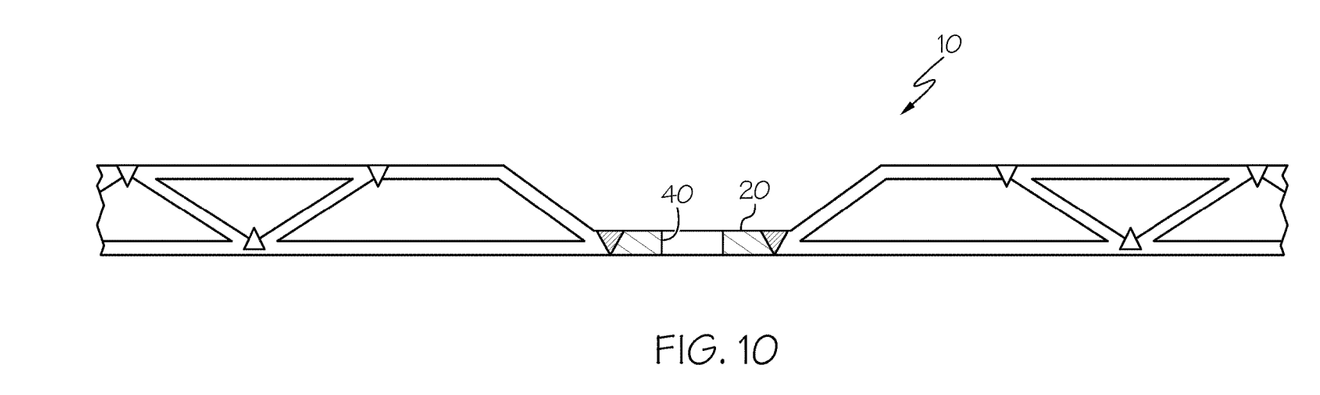
FIG. 10 is a side cross-sectional view of the multilayer structure of FIG. 9 having a bore formed therein in accordance with yet another step of the method of FIG. 3.

At Block 114 (FIG. 3), the resulting multilayer structure 10 is optionally machined to form a bore 40 in the attachment member 20, as shown in FIG. 10. For example, the machining 114 can include drilling the bore 40 through the attachment member 20. The bore 40 may facilitate connecting the multilayer structure 10 to another structure 90, such as another multilayer structure, a frame, etc., using a mechanical fastener 42, such as a nut/bolt, a rivet, a screw or the like.

Figure 12:
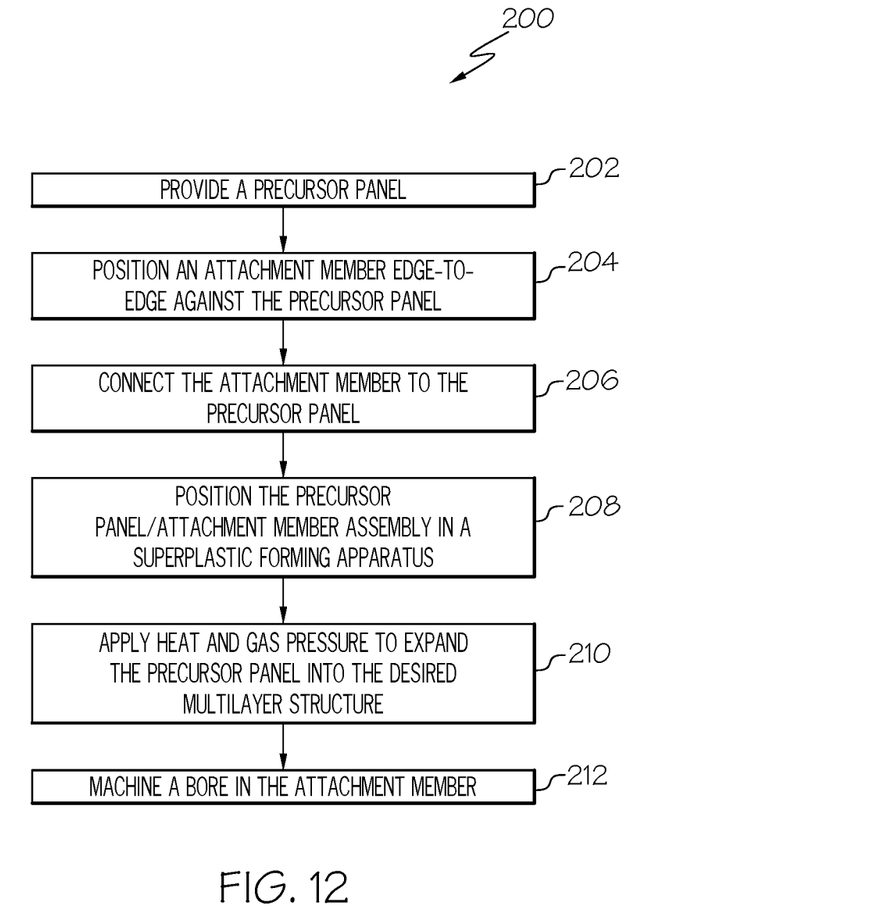
FIG. 12 is a flow diagram depicting another embodiment of the disclosed method for forming a multilayer structure.
Figure 13:
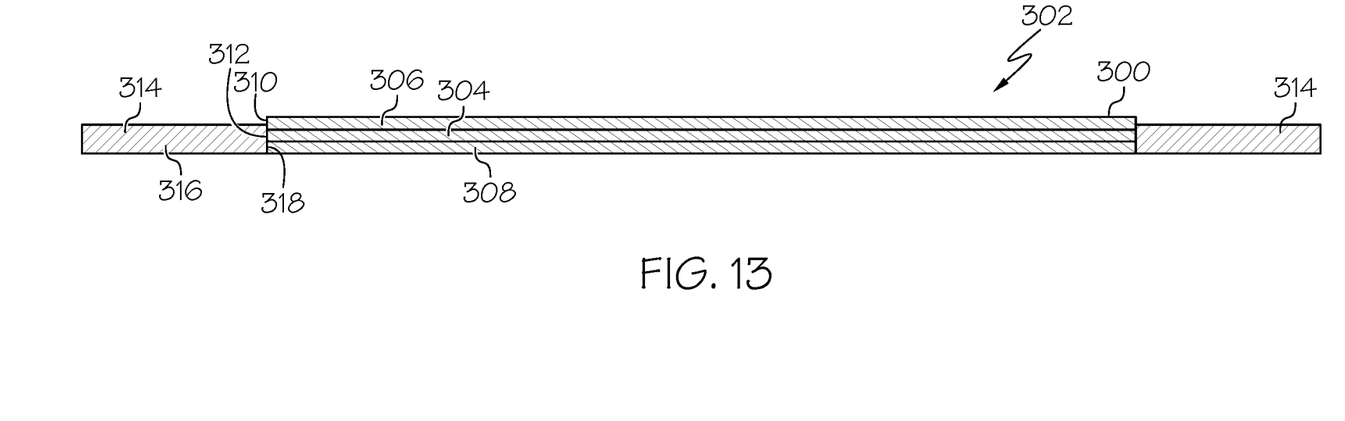
FIG. 13 is a side cross-sectional view of a precursor panel shown during one step of the method of FIG. 12.

Referring to FIG. 12, another embodiment of the disclosed method for forming a multilayer structure, generally designated 200, slightly differs from method 100 (FIG. 3). Specifically, per method 200, a recess 54 (FIG. 5) and associated edge 60 (FIG. 5) need not necessarily be formed in the precursor panel 300 (FIG. 13). Rather, the edge-to-edge connection between the monolithic attachment member 314 (FIG. 13) and the precursor panel 300 is made at the perimeter 310 of the precursor panel 300.

The method 200 begins at Block 202 with the step of providing a precursor panel 300, as shown in FIG. 13. The precursor panel 300 has a layered structure 302 that includes, for example, a core layer 304 sandwiched between a first face layer 306 and a second face layer 308. The core layer 304 may be welded to the first face layer 306 and the second face layer 308 as described herein and shown in FIG. 4. Therefore, the precursor panel 300 defines a perimeter 310 and an edge 312 extending about the perimeter 310.

At Block 204 (FIG. 12), an attachment member 314 is positioned in edge-to-edge alignment with the precursor panel 300, as shown in FIG. 13. The attachment member 314 has a monolithic body 316 and defines an edge 318. Therefore, the positioning step (Block 204) includes aligning and abutting the edge 318 of the attachment member 314 with the edge 312 of the precursor panel 300.

In one particular construction, the attachment member 314 extends, either continuously or discontinuously, about the perimeter 310 of the precursor panel 300, thereby effectively framing the precursor panel 300. Therefore, upon connecting (Block 206) the attachment member 314 to the precursor panel 300, the attachment member 314 seals, at least partially, the edge 312 of the precursor panel 300.

At Block 206 (FIG. 12), the attachment member 314 is connected to the precursor panel 300 to form a precursor panel/monolithic body assembly. For example, the edge 318 of the attachment member 314 is connected to the edge 312 of the precursor panel 300 such that the attachment member 314 is connected to each layer (the core layer 304, first face layer 306, the second face layer 306) of the layered structure 302 of the precursor panel 300.

The connection between the attachment member 314 and the precursor panel 300 may be made by welding, such as by arc welding, friction stir welding or the like. Therefore, the connecting step (Block 206) may result in the formation of a weld joint (see weld joint 64 in FIG. 7) between the attachment member 314 and the precursor panel 300.

Figure 14:
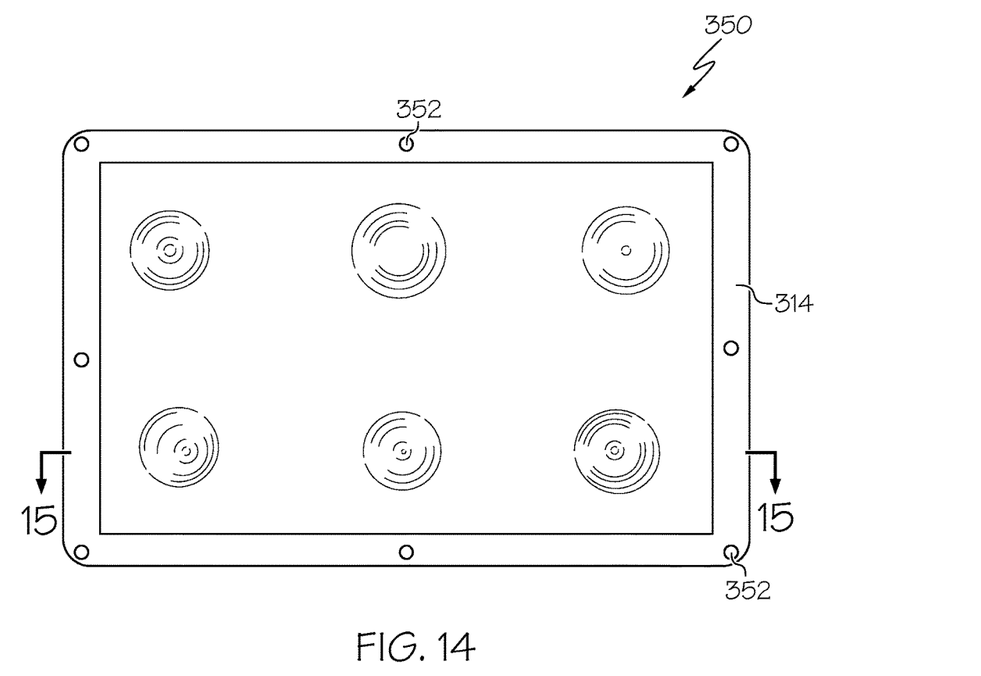
FIG. 14 is a top plan view of the multilayer structure formed from the precursor panel of FIG. 13.
Figure 15:
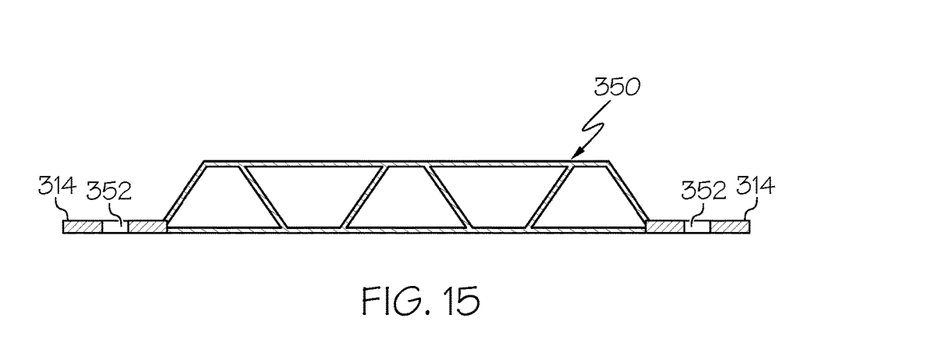
FIG. 15 is a side cross-sectional view of the multilayer structure of FIG. 14.

At Blocks 208 and 210 (FIG. 12), the precursor panel/monolithic body assembly is positioned in a superplastic forming apparatus and subjected to a superplastic forming process of applying heat and gas pressure, as described herein (see Blocks 110 and 112 of FIG. 3), thereby yielding a multilayer structure 350, as shown in FIGS. 14 and 15. Optionally, at Block 212 (FIG. 12), the resulting multilayer structure 350 is machined (e.g., drilling, reaming, etc.) to form one or more bores 352 in the attachment member 314. The bores 352 may facilitate connecting the multilayer structure 350 to another structure, such as another multilayer structure, a frame, etc., using a mechanical fastener, such as a nut/bolt, a rivet, a screw or the like.

Accordingly, the attachment member 20, 314 of the disclosed multilayer structure 10, 350 may provide a solid and rigid foundation for connecting the multilayer structure 10, 350 to one or more other structures 90 (FIG. 11), such as with mechanical fasteners 42 (FIG. 11), or using other techniques (e.g., welding).

Although various embodiments of the disclosed method for forming a multilayer structure have been shown and described, modifications may occur to those skilled in the art upon reading the specification. The present application includes such modifications and is limited only by the scope of the claims.

What is claimed is:

1. A method for forming a multilayer structure from a precursor panel having an edge, said method comprising:
   connecting an attachment member to said precursor panel such that an edge of said attachment member is in alignment with said edge of said precursor panel; and
   applying heat and gas pressure to expand said precursor panel.

2. The method of claim 1 wherein said connecting said attachment member to said precursor panel comprises connecting an attachment member that comprises a monolithic body.

3. The method of claim 1 wherein said connecting said attachment member to said precursor panel comprises connecting a precursor panel that comprises a layered structure.

4. The method of claim 3 comprising connecting said attachment member to each layer of said layered structure.

5. The method of claim 1 wherein said connecting said attachment member to said precursor panel comprises connecting a precursor panel that comprises a core layer positioned between a first face layer and a second face layer.

6. The method of claim 5 wherein a plurality of first welds connect said core layer to said first face layer and a plurality of second welds connect said core layer to said second face layer.

7. The method of claim 1 wherein said connecting said attachment member to said precursor panel comprises connecting a precursor panel that comprises a perimeter and said edge of said precursor panel extends about said perimeter.

8. The method of claim 7 wherein said connecting said attachment member to said precursor panel comprises connecting said attachment member such that said attachment member continuously extends about said perimeter.

9. The method of claim 1 wherein said connecting said attachment member to said precursor panel comprises connecting a precursor panel that comprises a recess, wherein said edge of said precursor panel is defined by said recess.

10. The method of claim 9 wherein said connecting said attachment member to said precursor panel comprises connecting an attachment member that is sized and shaped to be closely received in said recess.

11. The method of claim 9 further comprising the step of forming said recess in said precursor panel.

12. The method of claim 1 comprising connecting said attachment member to said precursor panel by welding.

13. The method of claim 1 wherein said applying heat and gas pressure comprises heating said precursor panel to render said precursor panel superplastic.

14. The method of claim 13 wherein said applying heat and gas pressure comprises introducing a gas into an internal volume of said precursor panel.

15. The method of claim 1 wherein said applying heat and gas pressure comprises urging said precursor panel against a tool.

16. The method of claim 1 further comprising machining a bore in said attachment member.

17. The method of claim 1 wherein said connecting said attachment member to said precursor panel comprises connecting an attachment member formed from a titanium alloy to a precursor panel formed from a titanium alloy.

18. The multilayer structure formed from the method of claim 1, the multilayer structure comprising a monolithic attachment member.

19. A method for forming a multilayer structure comprising a precursor panel having a layered structure, said method comprising:
   forming a recess in said precursor panel, said recess defining an edge;
   positioning an attachment member in said recess such that an edge of said attachment member is in alignment with said edge of said precursor panel, said attachment member comprising a monolithic body;
   connecting said attachment member to said precursor panel; and
   applying heat and gas pressure to expand said precursor panel.

20. The method of claim 19 wherein said applying heat and gas pressure comprises heating said precursor panel to render said precursor panel superplastic.

* * * * *